(12) United States Patent
Wen et al.

(10) Patent No.: US 11,873,130 B2
(45) Date of Patent: Jan. 16, 2024

(54) ROBOTIC LABELING SYSTEM AND METHOD OF LABELING PACKAGES

(71) Applicant: TE Connectivity Services GmbH, Schaffhausen (CH)

(72) Inventors: Du Wen, Reading, PA (US); Edward T. Price, III, Mechanicsburg, PA (US); Hung Nguyen, Harrisburg, PA (US); Roberto Francisco-Yi Lu, Bellevue, WA (US); Jiankun Zhou, Middletown, PA (US)

(73) Assignee: TE Connectivity Solutions GmbH

( * ) Notice: Subject to any disclaimer, the term of this patent is extended or adjusted under 35 U.S.C. 154(b) by 51 days.

(21) Appl. No.: 17/557,443

(22) Filed: Dec. 21, 2021

(65) Prior Publication Data

US 2023/0192343 A1 Jun. 22, 2023

(51) Int. Cl.
*B32B 41/00* (2006.01)
*B65C 9/40* (2006.01)
*B65C 9/26* (2006.01)
*B25J 9/16* (2006.01)

(52) U.S. Cl.
CPC .............. *B65C 9/40* (2013.01); *B25J 9/1664* (2013.01); *B25J 9/1697* (2013.01); *B65C 9/26* (2013.01); *B65C 2009/401* (2013.01); *B65C 2009/408* (2013.01)

(58) Field of Classification Search
CPC ....... B65C 9/40; B65C 9/26; B65C 2009/401; B65C 2009/408; B25J 9/1664
USPC ................... 156/60, 64, 350, 351, 378, 379
See application file for complete search history.

(56) References Cited

U.S. PATENT DOCUMENTS

2016/0052659 A1* 2/2016 Bowers ................... B65C 1/021
156/64
2018/0203650 A1* 7/2018 Le ......................... G06F 3/1244

* cited by examiner

*Primary Examiner* — Michael N Orlando
*Assistant Examiner* — Joshel Rivera (57) ABSTRACT

A robotic labeling system includes a package locating system, a package identification system having a scanning device configured to scan an identification tag on the package to identify an orientation of the package in the labeling station, and a label application system including a label printer and a label applicator. The label printer prints at least one label for the package. The label applicator includes a multi-axis robot having an arm movable in three-dimensional space. The label applicator has a portrait end effector coupled to the arm configured to transport the label from the label printer to the package in a portrait orientation. The label applicator has a landscape end effector coupled to the arm configured to transport the label from the label printer to the package in a landscape orientation. The label applicator is operated based on the orientation of the package in the labeling station as determined by the scanning device.

20 Claims, 7 Drawing Sheets

ROBOTIC LABELING SYSTEM AND METHOD OF LABELING PACKAGES

BACKGROUND OF THE INVENTION

The subject matter herein relates generally to package labeling systems and methods.

Package labeling is a manual process at many warehouses and distribution centers. The manual labeling process relies on operators to determine the location where the labels need to be applied. Manual labeling processes have high labor costs, are subject to human error, and are time consuming to apply the labels. Additionally, labels applied manually to packages may be at improper or unwanted positions and may be applied inconsistently from package to package. Some known automated labeling systems are in use in warehouses and distribution centers. However, conventional labeling systems use simple labeling methods to apply the labels to the packages. For example, the conventional labeling systems use a single axis arm attached to a printer to apply the label to the box. The label is always applied to the same side of the box and is applied in the same orientation to each box. The box is required to have a particular orientation relative to the printer and the label applicator. Known automated labeling systems do not tend to accommodate different sized packages.

A need remains for a dynamic, automated labeling system for labeling packages.

BRIEF DESCRIPTION OF THE INVENTION

In an embodiment, a robotic labeling system is provided and includes a package locating system for locating a package at a labeling station. The robotic labeling system includes a package identification system having a scanning device configured to scan an identification tag on the package to identify an orientation of the package in the labeling station. The robotic labeling system includes a label application system including a label printer and a label applicator. The label printer prints at least one label for the package. The label applicator includes a multi-axis robot having an arm movable in three-dimensional space. The label applicator has a portrait end effector coupled to the arm configured to transport the label from the label printer to the package in a portrait orientation. The label applicator has a landscape end effector coupled to the arm configured to transport the label from the label printer to the package in a landscape orientation. The label applicator is operated based on the orientation of the package in the labeling station as determined by the scanning device.

In another embodiment, a robotic labeling system is provided and includes a package locating system for locating a package at a labeling station. The robotic labeling system includes a package identification system having a scanning device configured to scan an identification tag on the package to identify an orientation of the package in the labeling station. The robotic labeling system includes a label application system including a label printer and a label applicator. The label printer prints at least one label for the package. The label applicator includes a multi-axis robot having an arm movable in three-dimensional space. The label applicator has a portrait end effector coupled to the arm configured to transport the label from the label printer to the package in a portrait orientation. The label applicator including a landscape end effector coupled to the arm configured to transport the label from the label printer to the package in a landscape orientation. The label applicator includes a label verification scanning device configured to scan the label applied to the package by at least one of the portrait end effector and the landscape end effector to verify proper application of the label to the package.

In a further embodiment, a method of labeling a package and includes locating the package in a labeling station. The method scans an identification tag on the package using a scanning device to identify the package. The method prints a label for the package at a label printer. The printed label is in one of a portrait orientation or a landscape orientation based on the identity of the package determined by the scanning device. The method applies the label to the package using a portrait end effector of a label applicator when the label is in the portrait orientation. The method applies the label to the package using a landscape end effector of the label applicator when the label is in the landscape orientation.

DETAILED DESCRIPTION OF THE INVENTION

Figure 1:
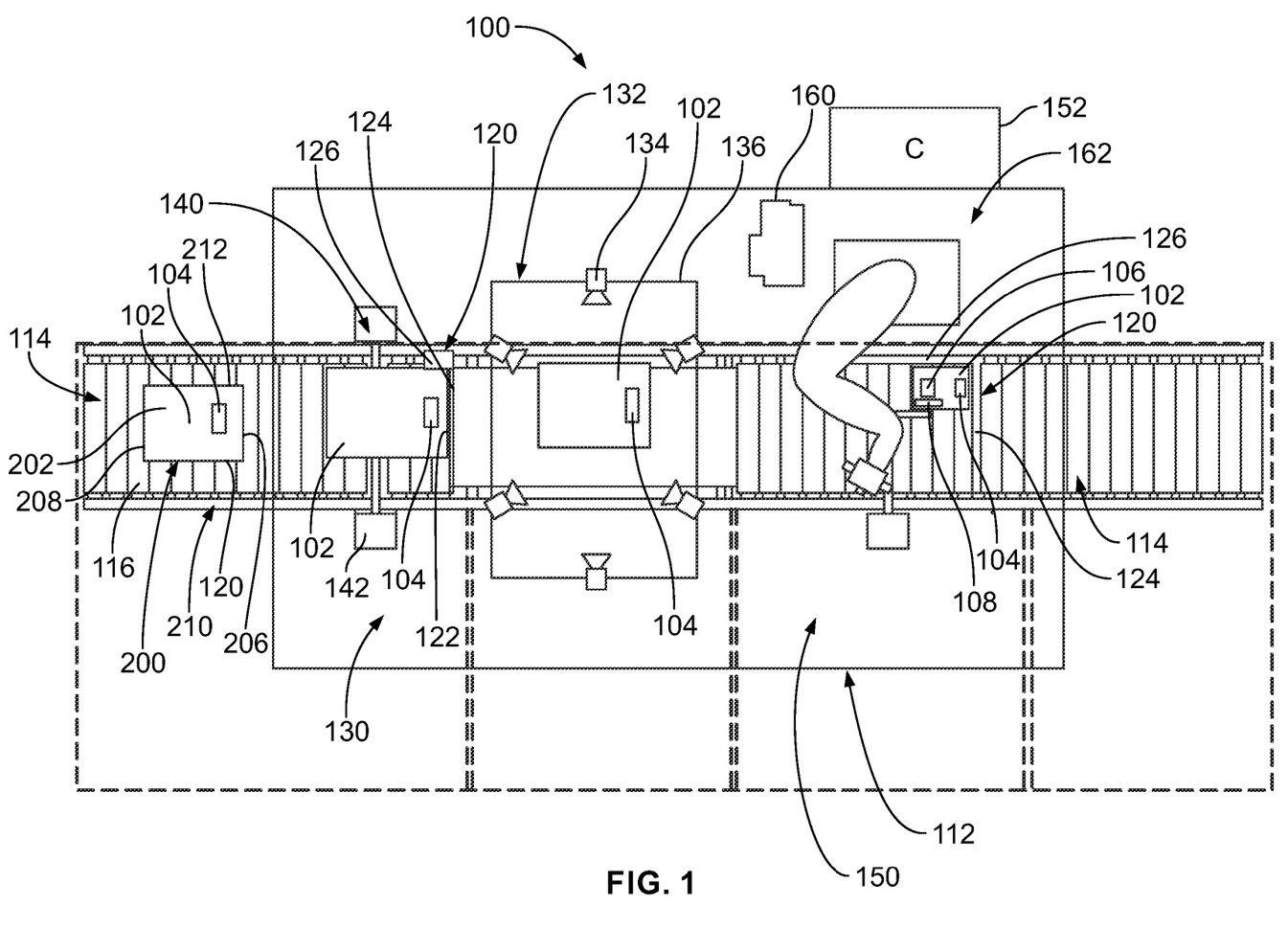
FIG. 1 illustrates a robotic labeling system in accordance with an exemplary embodiment.

FIG. 1 illustrates a robotic labeling system 100 in accordance with an exemplary embodiment. The robotic labeling system 100 is an automated system used for labeling packages 102. In an exemplary embodiment, the robotic labeling system 100 utilizes one or more multiple robots for applying one or more labels on the packages 102. The robotic labeling system 100 uses intelligent control algorithms to apply the label(s). The robotic labeling system 100 scans the labels after application to verify proper application of the label(s) to the package 102 before sending the package to another processing station.

The robotic labeling system 100 includes a package locating system 110 for locating the package 102 in a labeling station 112. Optionally, multiple labeling stations 112 may be provided and the package locating system 110 is used to locate packages at the various labeling stations.

The robotic labeling system 100 includes a package identification system 130 for identifying the package 102 in the labeling station 112. The robotic labeling system 100 includes a label application system 150 for applying labels to the package 102. In various embodiments, the label application system 150 may apply multiple labels to each package 102, such as to various sides 200 of the package 102.

The package 102 may be a box, such as a cardboard box, or other type of container. In various embodiments, the package 102 may be parallelepiped having six sides 200, including a top side 202, a bottom side (not shown, but located opposite the top side 202), a front side 206, a rear side 208, a right side 210, and a left side 212. The package 102 may include additional sides 200 in alternative embodiments. The package 102 may have other shapes in alternative embodiments. In various embodiments, the sides 200 may be flat or planar. Alternatively, one or more of the sides 200 may be curved. In an exemplary embodiment, the sides 200 meet at corners and have edges extending between the corners. In various embodiments, one or more of the sides 200 may be defined by panels meeting at seams. The panels may be taped at the seams. In various embodiments, the label application system 150 may avoid applying the labels at the seams (for example, avoid applying the labels over the tape).

In an exemplary embodiment, the package 102 includes an identification tag 104 at one of the sides 200. For example, the identification tag 104 may be a label applied to one of the sides 200. Alternatively, the identification tag 104 may be printed directly on one of the sides 200. The identification tag 104 is used to identify the particular package 102 (for example, compared to other packages 102). The identification tag 104 may be a unique identifier for the package 102. Information about the package 102 may be associated with the identification tag 104, such as data contained in database or package look-up table of a warehouse management system (WMS), and stored as identifying data. The identifying data about the package 102 may include content information relating to the contents of the package. The identifying data about the package 102 may include dimensional information relating to the height, width and length of the package. The identifying data may include shipping information relating to the package 102. In various embodiments, the identification tag 104 is a scannable tag, such as a barcode, a data matrix, a QR code, or another type of symbolic scan code. The identification tag 104 may be used to track the package 102 within a warehouse management system. In various embodiments, the identification tag 104 is applied to the package 102 outside of the labeling station 112. For example, the identification tag 104 may be applied to the package 102 prior to the package 102 being transported to the labeling station 112. The identification tag 104 may be applied to the package 102 when the package 102 is formed or when the package 102 is filled, such as at a packing station upstream of the labeling station 112. Alternatively, the identification tag 104 may be applied by the label application system 150 at the labeling station 112. The identification tag 104 may be applied to any of the sides 200. In various embodiments, the identification tag 104 may be on any of the sides 200 other than the bottom side 204. In various embodiments, multiple identification tags 104 may be provided, such as on two opposite sides (for example, to avoid having the identification tag 104 on the bottom side 204, and thus unviewable, as the package 102 is presented to the labeling station 112).

In an exemplary embodiment, the package 102 receives a shipping label 106. The shipping label 106 contains information about where the package 102 is being shipped. The shipping label 106 may include a name, an address, or other identifying data. In various embodiments, the shipping label 106 may include symbolic scan codes used for shipping. The shipping label 106 is applied to the package 102 by the label application system 150 at the labeling station 112. The shipping label 106 may be applied to any of the sides 200 other than the bottom side 204. In various embodiments, the shipping label 106 may be applied to any of the sides 200 other than the side including the identification tag 104. The shipping label 106 may have a portrait orientation (for example, tall or longer in the height direction than the width direction). Alternatively, the shipping label 106 may have a landscape orientation (for example, wide or longer in the width direction than the height direction). In various embodiments, the label application system 150 does not apply any other labels to the side 200 that receives the shipping label 106.

In an exemplary embodiment, the package 102 receives one or more customer specified labels 108. The customer specified label 108 may contain information about the contents of the package 102 or other information. For example, the customer specified label 108 may contain information about the shipper of the package 102, the location of where the package 102 is being shipped from, return shipping information, warning labels regarding the package 102 or the content of the package 102, and the like. In various embodiments, the customer specified label 108 may include symbolic scan codes having data relating to the content of the package 102 or other information. The customer specified label 108 is applied to the package 102 by the label application system 150 at the labeling station 112. The customer specified label 108 may be applied to any of the sides 200 other than the bottom side 204. In various embodiments, the customer specified label 108 may be applied to any of the sides 200 other than the side including the identification tag 104. The customer specified label 108 may have a portrait orientation (for example, tall or longer in the height direction than the width direction). Alternatively, the customer specified label 108 may have a landscape orientation (for example, wide or longer in the width direction than the height direction). In various embodiments, the label application system 150 does not apply any other labels to the side 200 that receives the customer specified label 108. For example, the shipping label 106 is applied to a different side 200 than the customer specified label 108. In various embodiments, two customer specified labels 108 are applied to the package on adjacent sides 200, such as proximate to the edge between the adjacent sides 200. Other types of labels may be applied to the package 102 in alternative embodiments.

In an exemplary embodiment, the package locating system 110 includes a transportation device 114 for moving the package 102 to the labeling station 112. In the illustrated embodiment, the transportation device 114 includes a conveyor 116. The conveyor 116 moves the package to the package identification system 130 and/or moves the package 102 to the label application system 150 and/or moves the package 102 away from the labeling station 112, such as to a sorting station or other processing station such as a robotic palletizer. Other types of transportation devices 114 may be used in alternative embodiments. The package locating system 110 includes one or more indexing devices 120 having datum surfaces 122 for locating the package 102 in the labeling station 112. In the illustrated embodiment, multiple indexing devices 120 are provided for positioning the packages 102 at different positions within the labeling station 112. The indexing device 120 may include a stop gate 124 used to stop the package 102 on the conveyor 116. The stop gate 124 controls a front-to-rear position of the package 102 in the labeling station 112. The indexing device 120 may include a side rail 126 for controlling a side-to-side position of the package 102 in the labeling station 112. The conveyor 116 may drive the package 102 into the side rail 126 to ensure that the package 102 is positioned against the side rail 126 for locating the package 102 in the labeling station 112. In various embodiments, the stop gate 124 and the side rail 126 may position the package 102 at a datum position for measuring the package. In various embodiments, the stop gate 124 and the side rail 126 may position the package 102 at a datum position for scanning the package, such as for identifying the package 102, such as for scanning the identification tag 104. In various embodiments, the stop gate 124 and the side rail 126 may position the package 102 at a datum position for applying the label(s) to the package 102. When the package 102 engages the stop gate 124 and the side rail 126, the location of the package 102 is known by the robotic labeling system 100 for applying the labels to the package 102. Other types of indexing devices may be used in alternative embodiments.

In an exemplary embodiment, the package identification system 130 includes a scanning device 132 for identifying the package 102. In various embodiments, the scanning device 132 may include one or more cameras 134. The cameras 134 may be mounted to a frame 136. The frame 136 may be movable to control positioning of the camera(s) 134. In an exemplary embodiment, the cameras 134 are configured to view multiple sides 200 of the package 102. The scanning device 132 allows for vision inspection of the package 102. The scanning device 132 identifies an orientation of the package 102 in the labeling station 112. The label application system 150 is controlled based on the orientation of the package 102. The orientation of the package 102 in the labeling station 112 may be based on the location of the identification tag 104 (for example, the side 200 having the identification tag 104). In various embodiments, the scanning device 132 scans the package 102 to identify the particular side 200 having the identification tag 104. For example, the scanning device 132 may identify the top side 202 as having the identification tag 104 (top-side orientation); may identify the front side 206 is having the identification tag 104 (front-side orientation); may identify the rear side 208 as having the identification tag 104 (rear-side orientation); may identify the right side 210 as having the identification tag 104 (right-side orientation); or may identify the left side 212 as having the identification tag 104 (left-side orientation). The operation of the label application system 150 is controlled based on the orientation (for example, which side 200 has the identification tag 104). For example, the label application system 150 may determine appropriate sides 200 to apply the shipping label(s) 106 and the customer specified label(s) 108 based upon which side 200 has the identification tag 104.

In an exemplary embodiment, the package identification system 130 identifies a size of the package 102 and a shape of the package 102. In various embodiments, the scanning device 132 may be used to identify the size and the shape of the package 102. For example, the scanning device 132 may be used to scan the identification tag 104 and determine the size and shape of the package 102 based on data from the identification tag 104 (for example, data in the warehouse management system). In other various embodiments, the cameras 134 may be used to image the package 102 and the package identification system 130 may determine the size and the shape of the package 102 based on the image. For example, the package identification system 130 may identify the number of sides 200, the number of corners, the number of edges, the number of seams, the location of the seams, and the like based on pattern or boundary recognition. The package identification system 130 may identify a height of the package 102 and/or a width of the package 102 and/or a length of the package 102 from analysis of the image.

In an exemplary embodiment, the package identification system 130 includes a package measurement module 140 configured to determine at least one dimension of the package 102. The package measurement module 140 may include software to analyze the image data to determine the height and/or the width and/or the length of the package 102. The package measurement module 140 may include a communication element for retrieving package dimensions from the warehouse management system. In other various embodiments, the package identification system 130 includes one or more sensors 142 for measuring one or more dimensions of the package 102. The sensors 142 sense dimensions of the package 102 with reference to the datum of the indexing device 120. The package measurement module 140 receives inputs from the sensors 142 to determine the dimensions of the package 102. The size dimensions of the package 102 are used to control the label application system 150. For example, the label application system 150 may use the size dimensions to determine relevant labeling locations on the package 102. In an exemplary embodiment, the robotic labeling system 100 is capable of receiving different sized and shaped packages 102 and is capable of labeling such packages 102 by automatically determining the size and shape of the particular package 102 at the labeling station 112, either based on sensors, based on analyzing the image, or based on dimensional data from a database in the warehouse management system.

The label application system 150 is used to apply the labels to one or more of the sides 200 of the package 102. In an exemplary embodiment, the label application system 150 includes a label printer 160 configured to print corresponding labels for the package 102. The label application system 150 includes a label applicator 162 configured to transfer the labels from the label printer 160 to the package 102. The label applicator 162 is used to apply the labels to the package 102. For example, the label applicator 162 may press the labels onto the sides 200 of the packages 102. In an exemplary embodiment, the label applicator 162 is configured to pick up and apply the labels in both a portrait orientation and a landscape orientation. For example, the label applicator 162 may include different heads (for example, a portrait head and a landscape head) to pick up the labels based on the desired label application orientation. Having multiple heads may speed up label application by reducing the number of movements and thus the movement time to position the label for application onto the package 102. In various embodiments, the label application system 150 may include multiple label printers 160 and/or multiple label applicators 162 for applying the labels.

In an exemplary embodiment, the label application system 150 includes a controller 152 that controls operation of the label application system 150. The controller 152 is operably coupled to the label printer 160 and the label applicator 162. The controller 152 receives inputs from the package locating system 110 and the package identification system 130 to determine a labeling scheme for labeling the package 102. The controller 152 determines which label to print, such as the shipping label 106, the customer specified label 108 or another type of label. The controller 152 controls operation of the label printer 160. The controller 152 controls the information printed on the label. The controller 152 controls the orientation of the printed data on the label, such as in either a portrait orientation or a landscape orientation based on how the label is to be applied to the package 102. The controller 152 controls operation of the label applicator 162 based on the orientation of the package 102. For example, the controller 152 controls to which side 200 the label is applied by the label applicator 162 based on the side 200 having the identification tag 104 (for example, applied to a different side). The controller 152 controls which applicator head (for example, portrait or landscape) to use to pick up the label. The controller 152 controls the label applicator 162 to apply the label in either the portrait orientation or the landscape orientation. The controller 152 controls operation of the label applicator 162 based on the size and shape of the package 102 determined by the package identification system 130. For example, the controller 152 determines appropriate labeling locations relative to the datum surface 122, based on the size and shape of the package 102, and controls movements of the label applicator 162 to move to such labeling locations and ensure that the movement of the label applicator 162 does not interfere with the package 102.

Figure 2:
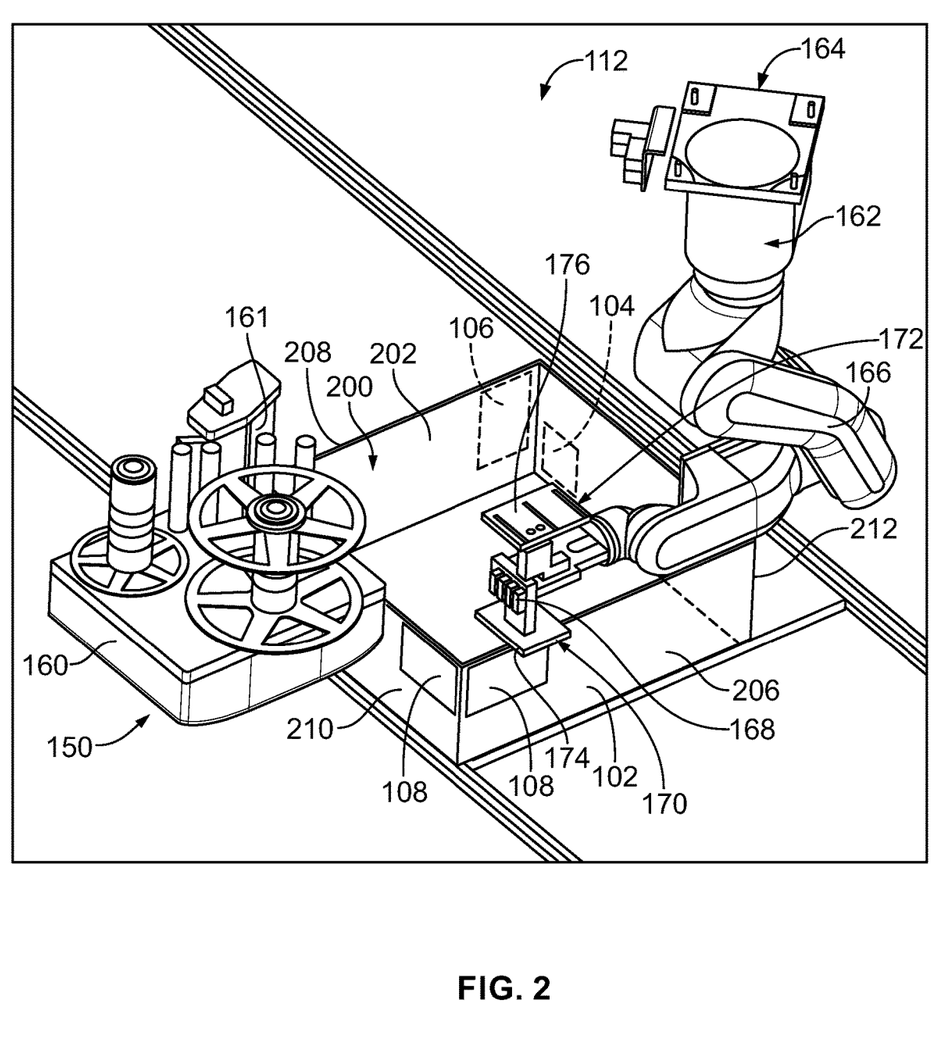
FIG. 2 is a perspective view of the label application system in accordance with an exemplary embodiment.

FIG. 2 is a perspective view of the label application system 150 in accordance with an exemplary embodiment. FIG. 2 shows the label printer 160 and the label applicator 162 in accordance with an exemplary embodiment. The label printer 160 includes a dispenser 161 for dispensing the labels after the labels are printed. The information printed on the label can be in either a portrait orientation or a landscape orientation, depending on how the label is to be applied to the package 102. FIG. 2 also shows the package 102 in the labeling station 112. The package 102 is shown in a left-hand orientation having the identification tag 104 (shown in phantom) at the left side 212 of the package 102. FIG. 2 shows the shipping label 106 (shown in phantom) at the rear side 208 in a portrait orientation (for example, longer in the height direction than the width direction). FIG. 2 shows two customer specific labels 108 at the front side 206 and the right side 210 both in landscape orientations (for example, longer in the width direction than the height direction).

The label applicator 162 picks up the label from the label printer 160, such as from the dispenser 161. In an exemplary embodiment, the label applicator 162 includes a multi-axis robot 164 having an articulating arm 166 that moves between the label printer 160 and the package 102. The label applicator 162 includes a portrait head 170 for applying labels in a portrait orientation and a landscape head 172 for applying the labels in a landscape orientation. Both of the heads 170, 172 are provided at a distal end of the arm 166 and are movable by the arm 166. The portrait head 170 includes a portrait end effector 174 used to hold the label in the portrait orientation. The landscape head 172 includes a landscape end effector 176 used to hold the label in the landscape orientation. The landscape end effector 176 extends along a longitudinal axis oriented generally perpendicular to a longitudinal axis of the portrait end effector 174. During application of the label on the package, the landscape end effector 176 may be arranged with the longitudinal axis oriented generally horizontally and the portrait end effector 174 may be arranged with the longitudinal axis oriented generally vertically. In various embodiments, the end effectors 174, 176 may be vacuum end effectors using suction to hold the labels on the end effectors 174, 176. Other types of end effectors may be used in alternative embodiments. The arm 166 is movable in three-dimensional space to apply labels to the top side 202 and/or the front side 206 and/or the rear side 208 and/or the right side 210 and/or the left side 212 of the package 102. The label applicator 162 is capable of applying multiple different labels on different sides of the package. The label applicator 162 is capable of applying the labels in different orientations on the package 102. The label applicator 162 is capable of applying labels to different sized boxes.

In an exemplary embodiment, the label application system 150 includes a label verification scanning device 168 configured to scan the labels applied to the package 102 to verify proper application of the labels. The label verification scanning device 168 may be provided at the distal end of the arm 166, such as proximate to the portrait head 170 and/or the landscape head 172. In an exemplary embodiment, the label verification scanning device 168 is provided between the portrait head 170 and the landscape head 172 to scan labels applied by either the portrait head 170 or the landscape head 172. In alternative embodiments, multiple label verification scanning devices 168 may be provided, such as one associated with the portrait head 170 and another associated with the landscape head 172.

The label verification scanning device 168 may include a camera, an optical scanning device or another type of scanning device. The label verification scanning device 168 allows for vision inspection and verification of the labels. For example, the label verification scanning device 168 may verify that the label has been applied. The label verification scanning device 168 may verify that the label is on the proper side 200 of the package 102. The label verification scanning device 168 may verify that the label is in the proper orientation on the package 102. The label verification scanning device 168 may verify that the label is in the proper location on the package 102. The label verification scanning device 168 may verify that the label has the appropriate information printed on the label. The label verification scanning device 168 may verify that the information printed is legible and/or scannable. The label verification scanning device 168 may verify that the label is applied correctly and without wrinkles. If the label verification scanning device 168 determines the applied label is defective, the package 102 may be rejected. However, if the label verification scanning device 168 verifies that the label is properly applied to the package 102, the package 102 may be transferred downstream to the next processing station, such as a package sorting station.

The label verification scanning device 168 is coupled to the arm 166 and is movable with the arm 166. As such, the label verification scanning device 168 is movable to view various sides of the package 102. The label verification scanning device 168 may scan the label immediately after the label is applied, such as prior to the arm 166 moving away from the application area. In alternative embodiments, the label verification scanning device 168 may be separate from the arm 166, such as including multiple scanning devices mounted around the labeling station 112 to view the different sides of the package 102.

Figure 3:
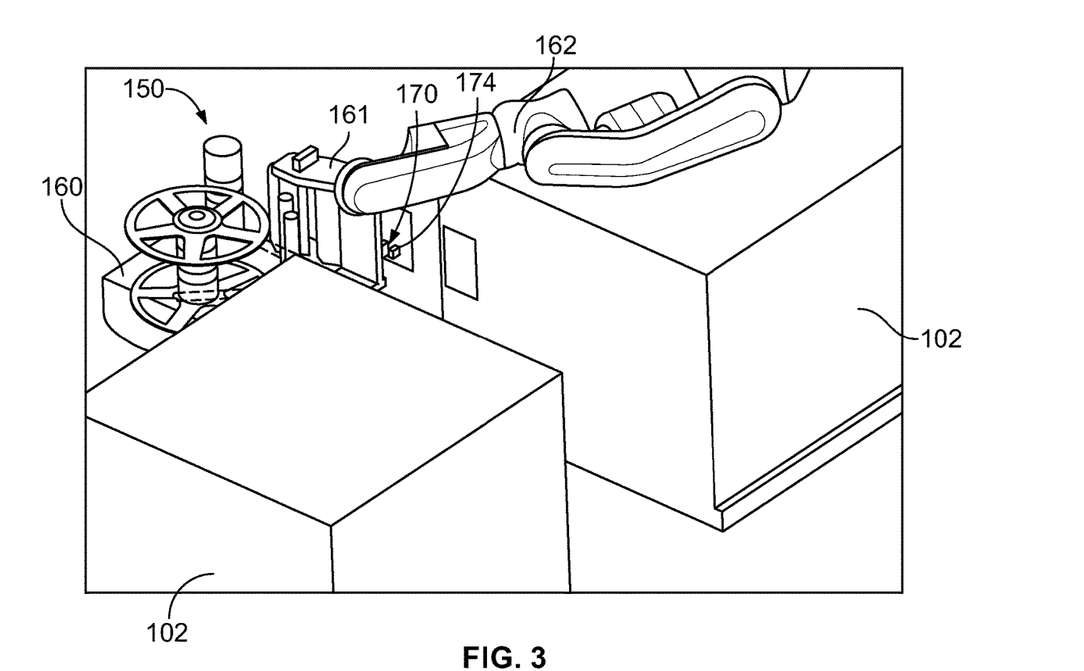
FIG. 3 is a perspective view of the label application system in accordance with an exemplary embodiment showing a label applicator gathering the label from the dispenser at the label printer.
Figure 4:
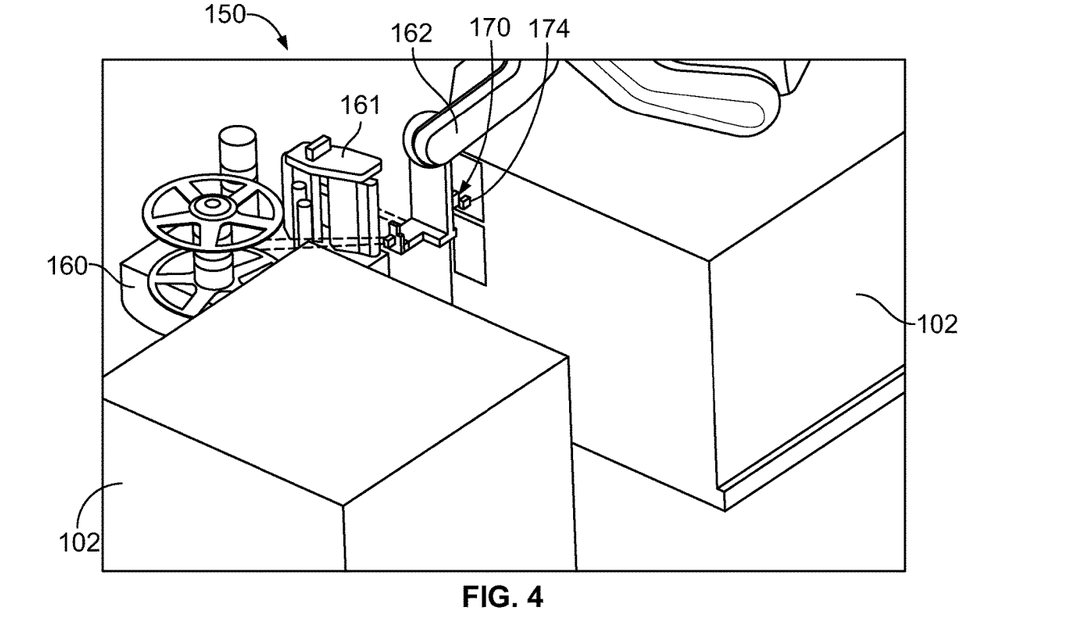
FIG. 4 is a perspective view of the label application system in accordance with an exemplary embodiment showing the label applicator applying the label to the package in a portrait orientation.

FIG. 3 is a perspective view of the label application system 150 in accordance with an exemplary embodiment showing the label applicator 162 gathering the label from the dispenser 161 at the label printer 160. FIG. 4 is a perspective view of the label application system 150 in accordance with an exemplary embodiment showing the label applicator 162 applying the label to the package in a portrait orientation.

The portrait head 170 is moved to the dispenser 161 to pick up the label. The portrait end effector 174 holds the label on the portrait head 170 in the portrait orientation. The label is pressed into the package 102 to apply the label to the package 102 in the portrait orientation.

Figure 5:
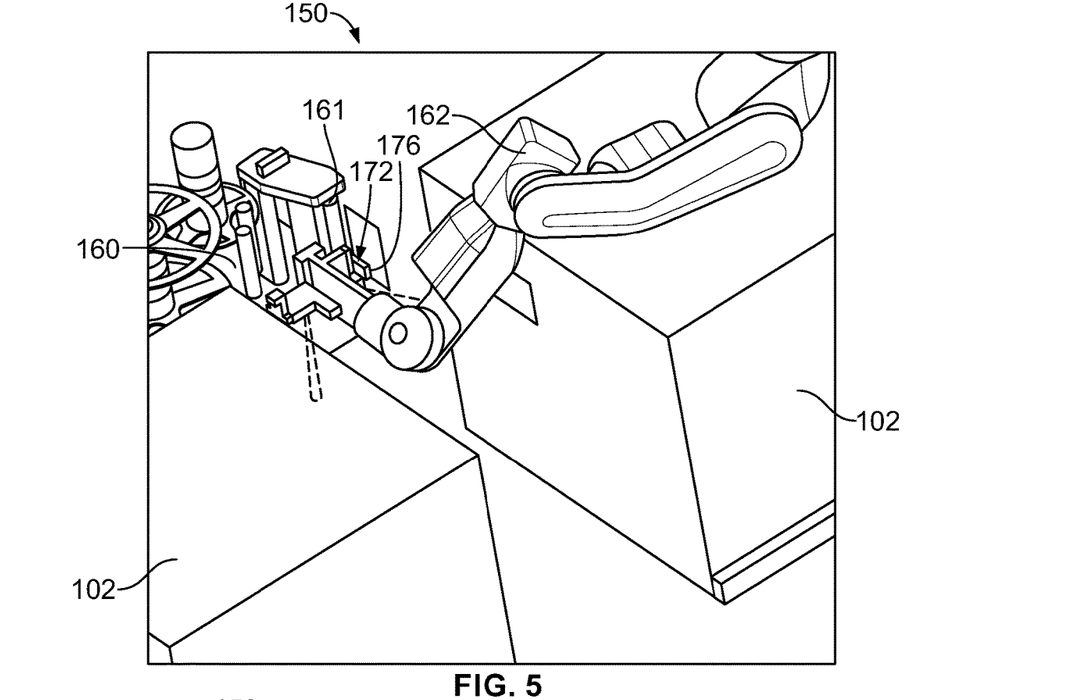
FIG. 5 is a perspective view of the label application system in accordance with an exemplary embodiment showing the label applicator gathering the label from the dispenser at the label printer.
Figure 6:
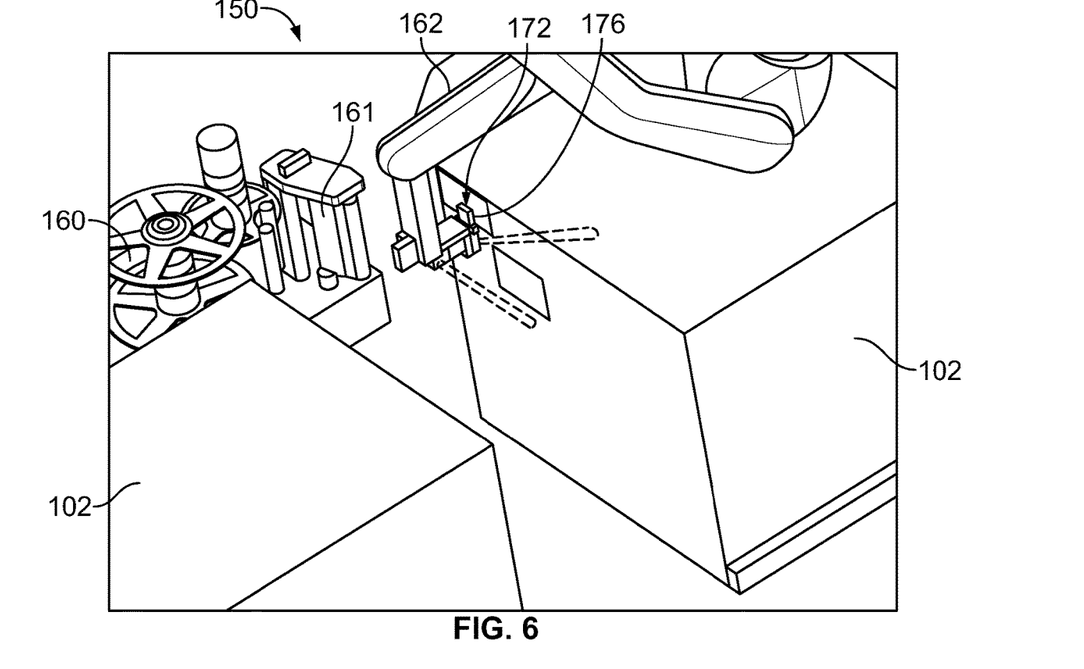
FIG. 6 is a perspective view of the label application system in accordance with an exemplary embodiment showing the label applicator applying the label to the package in a landscape orientation.

FIG. 5 is a perspective view of the label application system 150 in accordance with an exemplary embodiment showing the label applicator 162 gathering the label from the dispenser 161 at the label printer 160. FIG. 6 is a perspective view of the label application system 150 in accordance with an exemplary embodiment showing the label applicator 162 applying the label to the package in a landscape orientation. The landscape head 172 is moved to the dispenser 161 to pick up the label. The landscape end effector 176 holds the label on the landscape head 172 in the landscape orientation. The label is pressed into the package 102 to apply the label to the package 102 in the landscape orientation.

Figure 7:
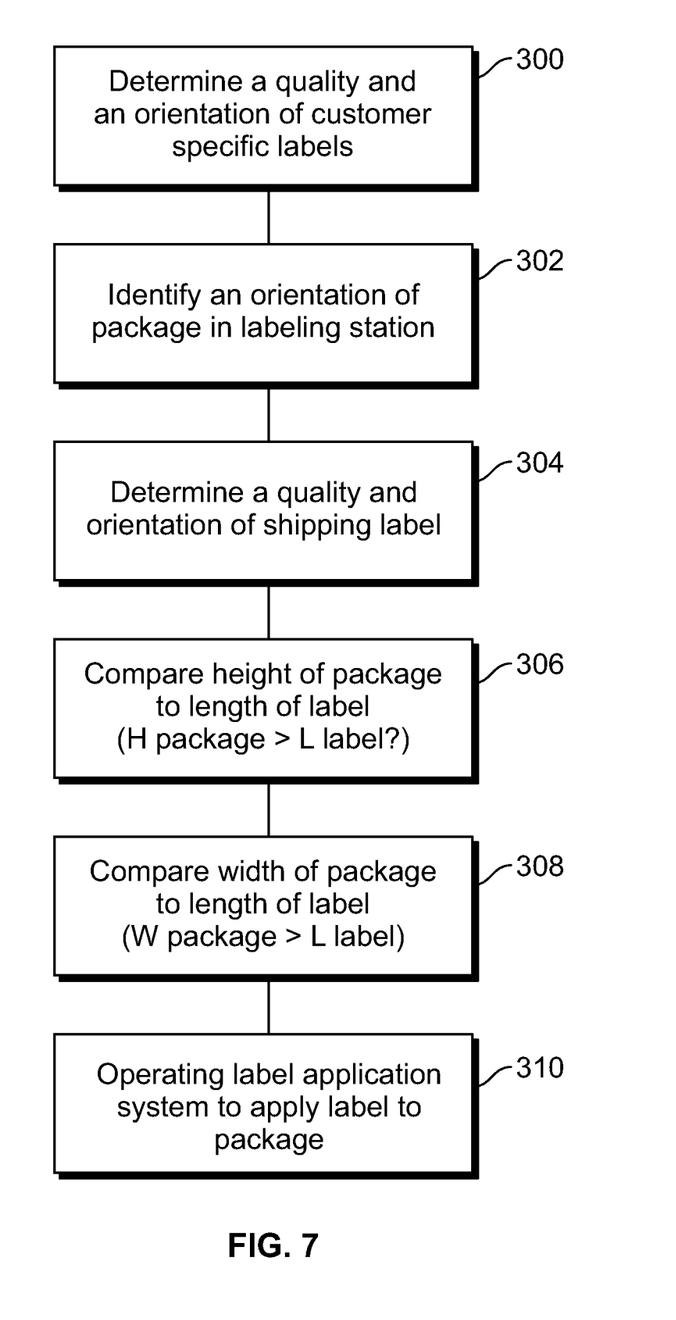
FIG. 7 is a flowchart of a method of operating a label application system to apply labels to a package in accordance with an exemplary embodiment.

FIG. 7 is a flowchart of a method of operating a label application system to apply labels to a package in accordance with an exemplary embodiment. The method may be used by a controller of the label application system to determine an appropriate labeling scheme for the particular package. The controller includes logic configured to determine an appropriate labeling scheme based on the package orientation and/or the package dimensions and/or the types of labels to be applied. The labeling scheme is based on the size of the package, the shape of the package, the number of labels that need to be applied to the package, relative locations of the labels (for example, same sides, different sides, adjacent sides, opposite sides, and the like). The labeling scheme developed using the method may be based on which side of the package has the identification tag as presented in the labeling station.

The method includes determining 300 a quantity and an orientation of the customer specific label(s). The orientation of the customer specific label may be either portrait or landscape. The orientation of the customer specific label may be set for the particular package. For example, some packages may require a portrait orientation while other packages may require a landscape orientation. The label orientations may be based on the type of package, the size of the package, or based on other factors. The label orientation and quantity may be stored in a database, such as in a package look-up table, of a warehouse management system. Each package has the customer specific label orientation stored in the database. The customer specific label orientation and quantity may be inputs transmitted to the controller of the label application system for operation of the label applicator.

The method includes identifying 302 an orientation of the package in the labeling station. The orientation of the package may be identified by scanning the package as the package is transported along the conveyor or when the package is stopped in the labeling station. The orientation of the package may be identified by a scanning device, such as a camera or an optical scanning device. The orientation of the package may be identified by scanning for an identification tag on the package. The orientation of the package may be identified by determining which side of the package includes the identification tag (for example, top, front, rear, right, left). The package orientation may be an input transmitted to the controller of the label application system for operation of the label applicator.

The method includes determining 304 a quantity and an orientation of the shipping label(s). The orientation of the shipping label may be either portrait or landscape. The label orientation and quantity may be stored in a database, such as in a package look-up table, of a warehouse management system. The shipping label orientation and quantity may be inputs transmitted to the controller of the label application system for operation of the label applicator.

The method includes comparing 306 a height of the package to a length (longest dimension) of the label. The label may be run through the printer such that the length of the label is oriented in a portrait orientation or landscape orientation. The length of the label is compared to the height of the package to determine if the label can be applied in a portrait orientation. If the height of the package is less than the length of the label, then the label is not able to be applied to the front, the rear, the right side or the left side of the package. Rather, the label must be applied to the top of the package. The height of the package may be determined by scanning or measuring the package using a sensor or a vision system. Alternatively, the height of the package may be determined by reference to a database, such as in a package look-up table, of a warehouse management system. The length of the label may be input into the system by the user, such as based on the type of labels supplied to the label printer. Alternatively, the length of the label may be determined by reference to a database, such as in a warehouse management system. The package height and the label length are inputs that may be transmitted to the controller of the label application system for operation of the label printer and the label applicator.

The method includes comparing 308 a width of the package to a length (longest dimension) of the label. The label may be run through the printer such that the length of the label is oriented in a portrait orientation or landscape orientation. The length of the label is compared to the width of the package to determine if the label can be applied in a landscape orientation. If the width of the package is less than the length of the label, then the label is not able to be applied to the front, the rear, the right side or the left side of the package. Rather, the label must be applied to the top of the package. The width of the package may be determined by scanning or measuring the package using a sensor or a vision system. Alternatively, the width of the package may be determined by reference to a database, such as in a package look-up table, of a warehouse management system. The length of the label may be input into the system by the user, such as based on the type of labels supplied to the label printer. Alternatively, the length of the label may be determined by reference to a database, such as in a warehouse management system. The package width and the label length are inputs that may be transmitted to the controller of the label application system for operation of the label printer and the label applicator.

The method includes operating 310 the label application system to apply the labels to the package. The method includes printing the labels for the package at a label printer and applying the labels to the package using a label applicator. The label printer is used to print shipping labels and/or customer specific labels based on the particular package needs. The package may be identified using a scanning device. The data that is to be printed on the labels may be contained in a warehouse management system. The orientation that the data is printed on the label (for example, portrait versus landscape) is determined based on the information contained in the database. The label is retrieved by the label applicator, such as using a portrait head or a landscape head, and applied in the proper orientation by the portrait head or the landscape head to an appropriate side of the package. The operation of the label applicator is controlled based on the inputs to the controller. Optionally, the method may include scanning the label applied to the package using a label verification scanning device to verify proper application of the label.

Figure 8:
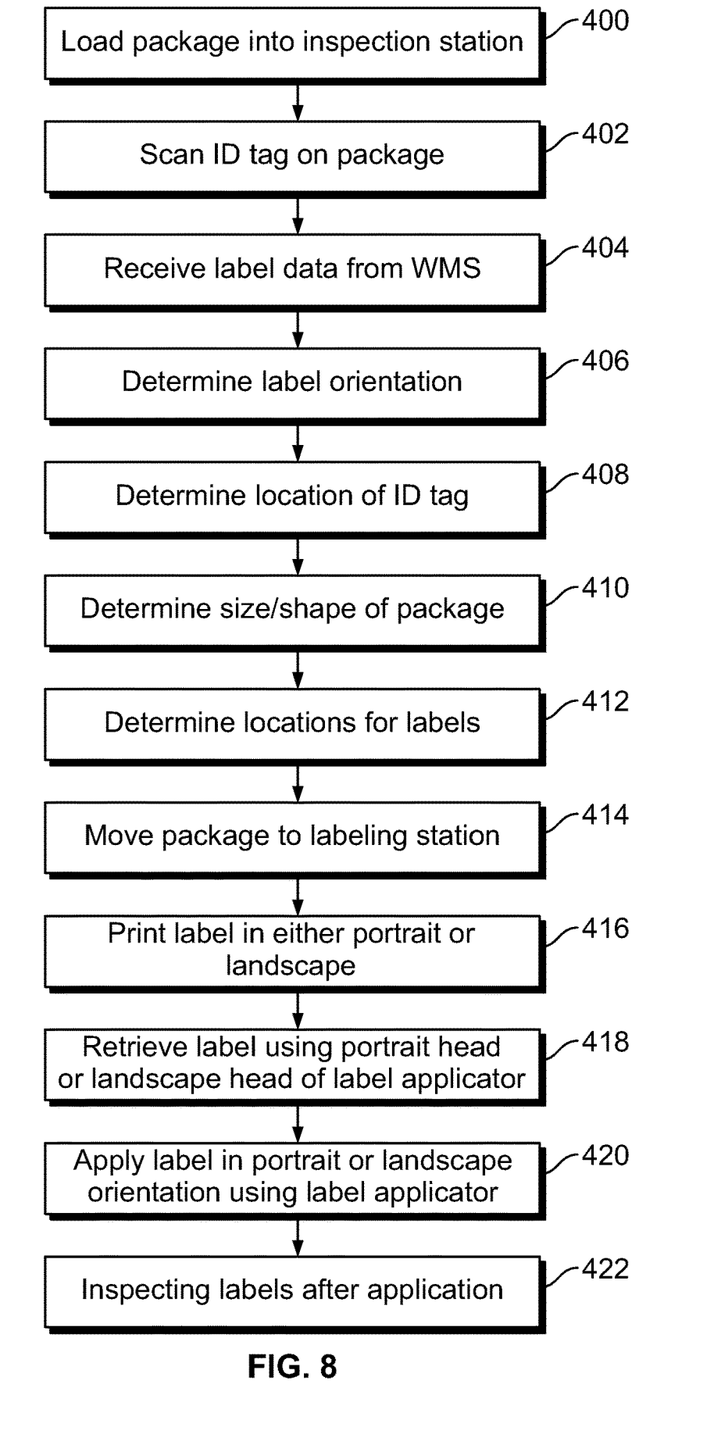
FIG. 8 is a flowchart of a method of labeling a package in accordance with an exemplary embodiment.

FIG. 8 is a flowchart of a method of labeling a package in accordance with an exemplary embodiment. The steps are an exemplary method of labeling a package. Various steps may be omitted in the order of the steps may be altered in various alternative embodiments. The method may be used by a controller of a label application system to determine an appropriate labeling scheme for the particular package. The controller includes logic configured to determine an appropriate labeling scheme based on the package orientation and the desired label orientations. The labeling scheme is based on the size of the package, the shape of the package, the number of labels that need to be applied to the package, relative locations of the labels (for example, same sides, different sides, adjacent sides, opposite sides, and the like), orientations of the labels (for example, portrait versus landscape). The labeling scheme developed using the method may be based on which side of the package has the identification tag as presented in the labeling station.

The method includes loading 400 packages into an inspection station and scanning 402 an identification tag on the package. The identification tag may include a symbolic scan code, such as a barcode or QR code. The identity data may be communicated with a warehouse management system (WMS). The controller compares the scanned data with the data in the database of the WMS to identify the particular package. The method includes receiving 404 label data from the warehouse management system. The method includes determining 406 label orientation for the labels. The method includes determining 408 a location of the identification tag on the package. The location of the identification tag may be determined by a scanning device, such as a camera, scanning the package. The method includes determining 410 a size and a shape of the package (for example, determining a height, a width, and a length of the package). The size and the shape of the package may be determined by a scanning device, such as a camera, scanning the package. The size of the shape of the package may be determined by sensors or other measuring devices at the inspection station. The size and shape of the package may be determined with reference to a database or look-up table of the WMS. The method includes determining 412 locations for the labels, which is based on the location of the identification tag. The labeling scheme may be controlled automatically without user input based on signals or inputs from the scanning device. Application of the labels is controlled based on the orientation of the package in the labeling station.

The method includes moving 420 the package to a labeling station. The package may be moved using a conveyor. The package may be positioned at a predetermined location within the labeling station, such as using an indexing device. The method includes printing 422 the labels for the package, which may be printed either portrait or landscape. The method includes retrieving 424 the labels from the label printer using a label applicator. The labels are retrieved by the label applicator using one of the portrait head or the landscape head for application to the package in the proper orientation. The method includes applying 426 the labels using the label applicator. The labels are applied in the proper orientation by the portrait head or the landscape head to an appropriate side of the package. The method includes inspecting 428 the labels after the labels are applied. The labels may be inspected using a label verification scanning device. The label verification scanning device may scan the label, such as scanning a symbolic scan code (for example, barcode or QR code) on the label. As such, the system operating the method may automatically reject packages determined to be defective to ensure that the packages do not continue downstream to other processing stations. The automated control system is controlled without operator intervention to speed up the package processing and reduce labor costs.

Figure 9:
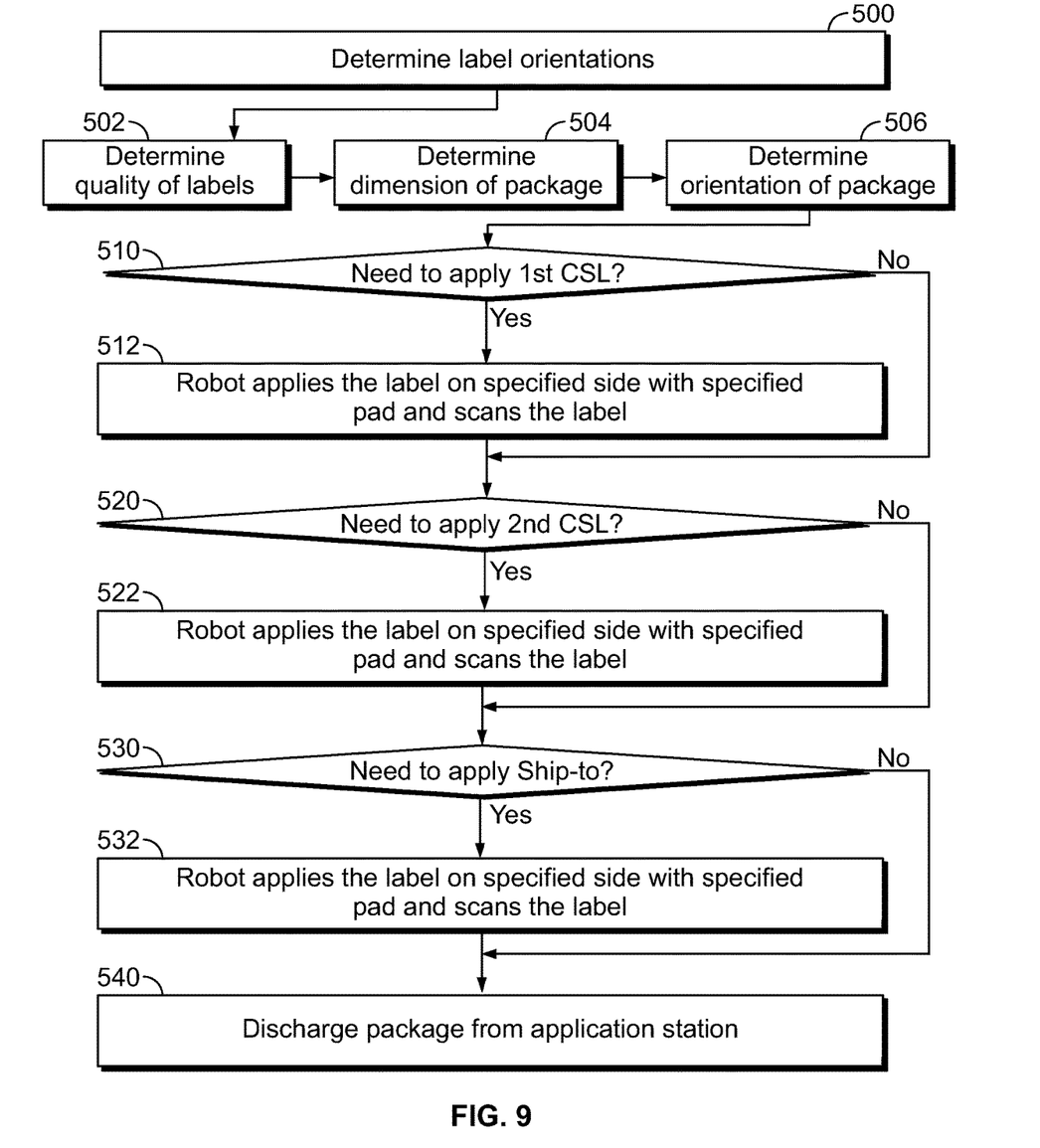
FIG. 9 is a flowchart of a method of labeling a package in accordance with an exemplary embodiment.

FIG. 9 is a flowchart of a method of labeling a package in accordance with an exemplary embodiment. Various steps may be omitted in the order of the steps may be altered in various alternative embodiments. The method may be used by a controller of a label application system to determine an appropriate labeling scheme for the particular package. The controller includes logic configured to determine an appropriate labeling scheme based on the package orientation and the desired label orientations. The labeling scheme is based on the size of the package, the shape of the package, the number of labels that need to be applied to the package, relative locations of the labels (for example, same sides, different sides, adjacent sides, opposite sides, and the like), orientations of the labels (for example, portrait versus landscape). The labeling scheme developed using the method may be based on which side of the package has the identification tag as presented in the labeling station.

The method includes determining 500 label orientation for the labels to be applied to the package. The label orientations are inputs transmitted to the controller of the label application system for operation of the label applicator. The method includes determining 502 a quantity of labels to be applied to the package. The label quantities are inputs transmitted to the controller of the label application system for operation of the label applicator. The method includes determining 504 dimensions of the package. The package dimensions are inputs transmitted to the controller of the label application system for operation of the label applicator. The method includes determining 506 an orientation of the package by determining a location of an identification tag on the package. The package orientations are inputs transmitted to the controller of the label application system for operation of the label applicator.

The method includes the step of determining 510 if the system needs to apply a first customer specific label. If so, the label applicator applies 512 the label on the specified side of the package with the specified applicator head (for example, portrait head versus landscape head). Optionally, the system may scan the customer specified label after application.

The method includes the step of determining 520 if the system needs to apply a second customer specific label. If so, the label applicator applies 522 the label on the specified side of the package with the specified applicator head (for example, portrait head versus landscape head). Optionally, the system may scan the customer specified label after application.

The method includes the step of determining 530 if the system needs to apply a shipping label. If so, the label applicator applies 532 the shipping label on the specified side of the package with the specified applicator head (for example, portrait head versus landscape head). Optionally, the system may scan the shipping label after application.

After all of the labels are applied, the system discharges 540 the package from the application station. The package may be discharged to another processing station for further processing or may be discharged to a packaging station where the packages are palletized or otherwise gathered for transportation. Optionally, if any of the scans of the labels determine that the package should be rejected, the package may be discharged from the labeling station and trashed, recycled, or sent for further processing, such as repackaging.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A robotic labeling system comprising:
a package locating system for locating a package at a labeling station;
a package identification system having a scanning device configured to scan an identification tag on the package to identify an orientation of the package in the labeling station; and
a label application system including a label printer and a label applicator, the label application system including a controller for controlling the label applicator, the label printer printing at least one label for the package, the label applicator including a multi-axis robot having an arm movable in three-dimensional space, the label applicator having a portrait end effector coupled to the arm configured to transport the label from the label printer to the package in a portrait orientation, the label applicator having a landscape end effector discrete from the portrait end effector and coupled to the arm and configured to transport the label from the label printer to the package in a landscape orientation, the label applicator being operated based on the orientation of the package in the labeling station as determined by the scanning device.

2. The robotic labeling system of claim 1, wherein the portrait end effector and the landscape end effector are provided at a distal end of the arm.

3. The robotic labeling system of claim 1, wherein the portrait end effector extends along a portrait axis and the landscape end effector extends along a landscape axis, the portrait axis being oriented perpendicular to the landscape axis.

4. The robotic labeling system of claim 1, wherein the controller is configured to control the label applicator in a first mode utilizing the portrait end effector and a second mode utilizing the landscape end effector such that only one of the portrait end effector or the landscape end effector picks up the label at a time.

5. The robotic labeling system of claim 1, wherein the controller controls the portrait end effector to apply the label in a generally vertical orientation and controls the landscape end effector to apply the label in a generally horizontal orientation.

6. The robotic labeling system of claim 1, wherein the controller is configured to determine which side of the package to which the label is applied based on the orientation of the package in the labeling station and controls the label applicator to apply the label to the side of the package as determined by the controller.

7. The robotic labeling system of claim 1, wherein the controller is configured to determine a height, a width, and a length of the package, the controller using the height, the width and the length dimensions to control the label applicator and apply the at least one label in either the portrait orientation or the landscape orientation based on the dimensions.

8. The robotic labeling system of claim 7, wherein the controller controls the label applicator to apply the label to the package in the landscape orientation if the height of the box is less than a height of the label.

9. The robotic labeling system of claim 7, wherein the controller controls the label applicator to apply the label to the package in the portrait orientation if the width of the box is less than a width of the label.

10. The robotic labeling system of claim 1, wherein the package identification system includes a package look-up table to determine a label type, a label orientation, and label contents based on the scan of the identification tag by the scanning device.

11. The robotic labeling system of claim 1, wherein the package identification system includes a package look-up table to determine a number of shipping labels to apply to the package and determine a number of customer specified labels to apply to the package based on the scan of the identification tag by the scanning device.

12. The robotic labeling system of claim 1, wherein the label application system includes a label verification scanning device configured to scan the at least one label applied to the package to verify proper application of the at least one label.

13. A robotic labeling system comprising:
a package locating system for locating a package at a labeling station;
a package identification system having a scanning device configured to scan an identification tag on the package to identify an orientation of the package in the labeling station; and
a label application system including a label printer and a label applicator, the label application system including a controller for controlling the label applicator, the label printer printing at least one label for the package, the label applicator including a multi-axis robot having an arm movable in three-dimensional space, the label applicator having a portrait end effector coupled to the arm configured to transport the label from the label printer to the package in a portrait orientation, the label applicator including a landscape end effector discrete from the portrait end effector and coupled to the arm and configured to transport the label from the label printer to the package in a landscape orientation, the label applicator including a label verification scanning device configured to scan the label applied to the package by at least one of the portrait end effector and the landscape end effector to verify proper application of the label to the package.

14. The robotic labeling system of claim 13, wherein the controller is configured to control the label applicator based on the orientation of the package in the labeling station as determined by the scanning device.

15. The robotic labeling system of claim 13, wherein the portrait end effector extends along a portrait axis and the landscape end effector extends along a landscape axis, the portrait axis being oriented perpendicular to the landscape axis.

16. The robotic labeling system of claim 13, wherein the controller is configured to determine which side of the package to which the label is applied based on the orientation of the package in the labeling station.

17. The robotic labeling system of claim 13, wherein the controller is configured to determine a height, a width, and a length of the package, the label application system using the height, the width and the length dimensions to control the label applicator and apply the at least one label in either the portrait orientation or the landscape orientation based on the dimensions.

18. A method of labeling a package comprising:
locating the package in a labeling station;
scanning an identification tag on the package using a scanning device to identify the package;
printing a label for the package at a label printer, the printed label being in one of a portrait orientation or a landscape orientation based on the identity of the package determined by the scanning device;
applying the label to the package using a portrait end effector of a label applicator when the label is in the portrait orientation; and
applying the label to the package using a landscape end effector of the label applicator discrete from the portrait end effector when the label is in the landscape orientation.

19. The method of claim 18, wherein said applying the label to the package using the portrait end effector and said applying the label to the package using the landscape end effector is determined based on which side of the package receives the label.

20. The method of claim 18, further comprising scanning the applied label using a label verification scanning device to verify proper application of the label.

* * * * *